US011552517B2

(12) United States Patent
Luo

(10) Patent No.: US 11,552,517 B2
(45) Date of Patent: Jan. 10, 2023

(54) SELF-RETAINING COMPRESSIONAL DIAPHRAGM SPRING

(71) Applicant: Schaeffler Technologies AG & Co. KG, Herzogenaurach (DE)

(72) Inventor: Tuo Luo, Cuyahoga Falls, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 293 days.

(21) Appl. No.: 16/870,252

(22) Filed: May 8, 2020

(65) Prior Publication Data

US 2021/0351647 A1 Nov. 11, 2021

(51) Int. Cl.
*H02K 1/28* (2006.01)

(52) U.S. Cl.
CPC .................................. *H02K 1/28* (2013.01)

(58) Field of Classification Search
CPC .................................. H02K 1/28; H02K 1/30
See application file for complete search history.

(56) References Cited

U.S. PATENT DOCUMENTS

| 4,648,499 A * | 3/1987 | Despres ............... F16D 23/146 |
| | | 192/70.13 |
| 2007/0257569 A1* | 11/2007 | Heyder .................. F16F 1/326 |
| | | 310/66 |
| 2019/0040917 A1* | 2/2019 | Persinger ................ H02K 7/10 |
| 2020/0067360 A1 | 2/2020 | Satyaseelan et al. |

OTHER PUBLICATIONS

U.S. Appl. No. 62/925,018, filed Oct. 23, 2019 (Unpublished).

* cited by examiner

*Primary Examiner* — Thomas Truong
(74) *Attorney, Agent, or Firm* — Volpe Koenig

(57) ABSTRACT

A rotor assembly is disclosed herein that includes a diaphragm spring for retaining other components of the rotor assembly. The rotor assembly includes a rotor, a rotor carrier supporting the rotor, at least one spacer arranged on a radially inner side of the rotor, and the diaphragm spring. The diaphragm spring includes a first end formed on a radially outer end of the diaphragm spring that engages against the at least one spacer, and a second end formed on a radially inner end of the diaphragm spring that engages against the rotor carrier.

19 Claims, 7 Drawing Sheets

SELF-RETAINING COMPRESSIONAL DIAPHRAGM SPRING

FIELD OF INVENTION

The present disclosure relates to a retention arrangement for a rotor assembly.

BACKGROUND

Electric motors are used in a wide range of industries. Electric motors typically include a stator and a rotor, as well as various other components. A rotor carrier is sometimes provided to support the rotor. In order to connect the rotor with the rotor carrier, various techniques and configurations are currently employed. One such technique requires shrink fitting or heat shrinking. Existing configurations have various drawbacks, in particular due to inaccurate tolerances or insufficient durability.

It is difficult to clamp the rotor with the rotor carrier with a sufficient connection and fitting between the components such that torque is reliably transmitted from the rotor to the rotor carrier.

It would be desirable to provide a more durable and reliable connection between the rotor and the rotor carrier that is also easy to assemble.

SUMMARY

An improved rotor assembly is disclosed herein that is durable, provides a reliable retention configuration, and is easy to assemble.

The rotor assembly includes a rotor, a rotor carrier supporting the rotor, at least one spacer arranged on a radially inner side of the rotor, and a diaphragm spring. The diaphragm spring includes a first end formed on a radially outer end of the diaphragm spring that engages against the at least one spacer, and a second end formed on a radially inner end of the diaphragm spring that engages against the rotor carrier.

In one embodiment, the first end of the diaphragm spring includes a base rim and the second end of the diaphragm spring includes a plurality of fingers. The plurality of fingers are uniformly spaced apart from each other and are arranged around an entire circumference of the diaphragm spring. In one embodiment, the plurality of fingers includes more than twenty fingers.

The rotor carrier includes a groove defining an end face that is configured to engage the second end of the diaphragm spring. The at least one spacer includes a shoulder configured to engage the first end of the diaphragm spring. The shoulder has an angled contact surface configured to engage the first end of the diaphragm spring. In one embodiment, the first end of the diaphragm spring contacts an entirety of the angled contact surface of the shoulder of the at least one spacer.

In one embodiment, the diaphragm spring has a single curvature when viewed in a circumferential cross-section, and the diaphragm spring has a uniform thickness.

In an assembled condition, an angle of 105 degrees-120 degrees is defined between the first end and the second end of the diaphragm spring In one embodiment, the at least one spacer includes a secondary spacer arranged between a radially outer surface of the rotor and a radially inner surface of the rotor carrier.

The at least one spacer contacts both: (i) a radially inner surface of the rotor, and (ii) a radially outer surface of the first end of the diaphragm spring.

The rotor, the rotor carrier, and the at least one spacer are retained with each other via a biasing force provided by the diaphragm spring.

Additional embodiments are disclosed herein.

BRIEF DESCRIPTION OF THE DRAWINGS

The foregoing Summary and the following Detailed Description will be better understood when read in conjunction with the appended drawings, which illustrate a preferred embodiment of the disclosure. In the drawings.

DETAILED DESCRIPTION OF THE PREFERRED EMBODIMENTS

Figure 1:
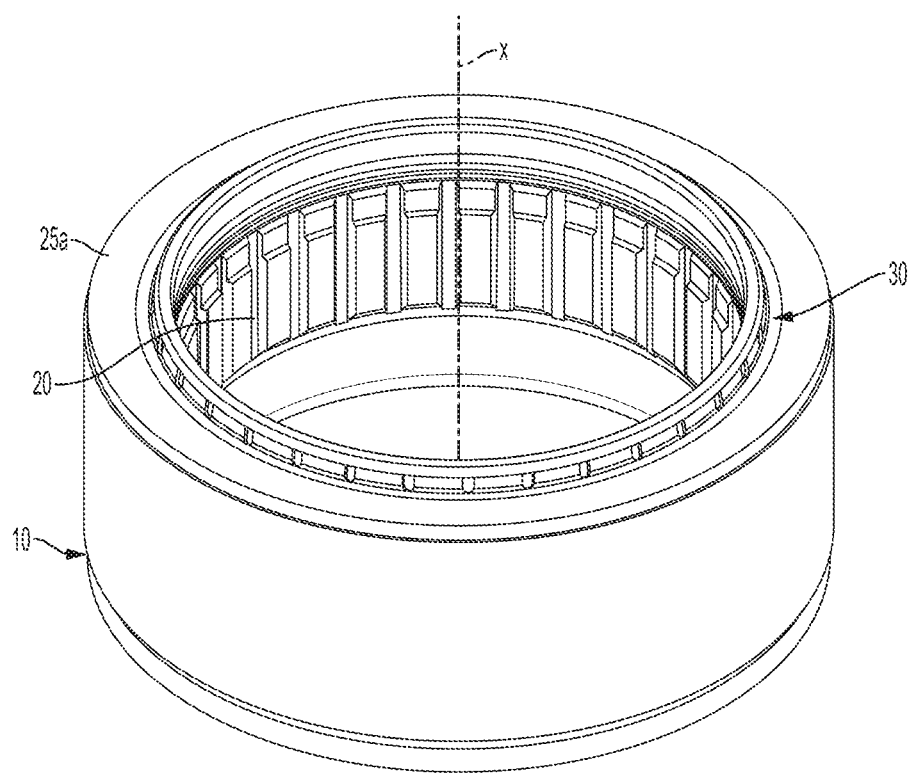
FIG. 1 is a perspective view of a fully assembled rotor assembly.
Figure 2A:
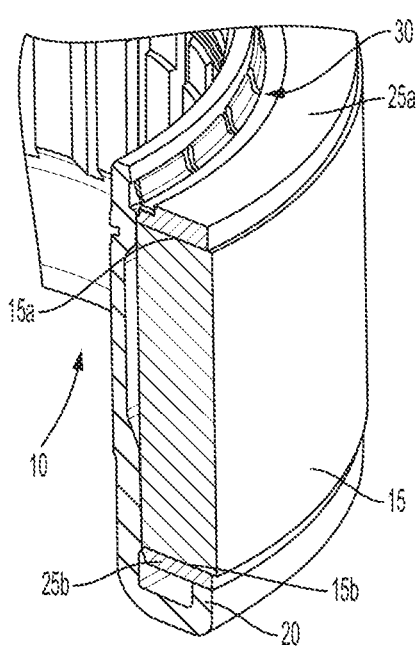
FIG. 2A is a cross-sectional perspective view of the fully assembled rotor assembly of FIG. 1.
Figure 2B:
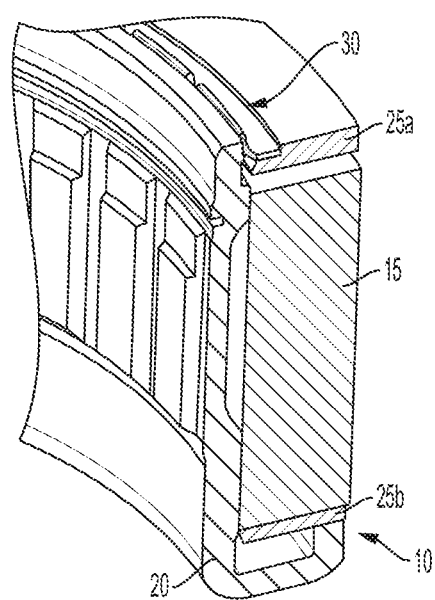
FIG. 2B is another cross-sectional perspective view of the fully assembled rotor assembly of FIG. 1.

Certain terminology is used in the following description for convenience only and is not limiting. "Axially" refers to a direction along an axis (X) of an assembly. "Radially" refers to a direction inward and outward from the axis (X) of the assembly. "Circumferentially" refers to a direction extending along a curve or circumference of a respective element relative to the axis (X) of the assembly.

A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

A rotor assembly 10 is generally illustrated in FIGS. 1, 2A, 2B, 3A, and 3B. The rotor assembly 10 includes a rotor 15 and a rotor carrier 20 supporting the rotor 15.

At least one spacer 25a is arranged on a radially inner side 15a of the rotor 15. In one embodiment, the at least one spacer 25a includes a first spacer 25a and a second spacer 25b.

A diaphragm spring 30 is generally positioned between the rotor carrier 20 and the at least one spacer 25a. More details of the diaphragm spring 30 are generally shown in FIGS. 4A-4D. The diaphragm spring 30 includes a first end 32 formed on a radially outer end of the diaphragm spring 30 that engages against the at least one spacer 25a, and a second end 34 formed on a radially inner end of the diaphragm spring 30 that engages against the rotor carrier 20. The rotor 15, the rotor carrier 20 and the at least one spacer 25a are retained with each other via a biasing force provided by the diaphragm spring 30.

In one embodiment, the diaphragm spring 30 is formed from steel. In one embodiment, the diaphragm spring 30 is formed from 6150 case hardened steel. In one embodiment, the diaphragm spring 30 has a uniform thickness. One of ordinary skill in the art would understand based on the present disclosure that other materials can be used to form the spring 30 and the spring 30 can have varying shapes depending on the specific requirements of a particular application.

The first end 32 of the diaphragm spring 30 includes a base rim 33 and the second end 34 of the diaphragm spring 30 includes a plurality of fingers 35. In one embodiment, the plurality of fingers 35 are uniformly spaced apart from each other and are arranged around an entire circumference of the diaphragm spring 30. In one embodiment, the plurality of fingers 35 includes more than twenty fingers. One of ordinary skill in the art would understand that the configuration of the fingers 35 can vary depending on the specific requirements of a particular application.

In one embodiment, the rotor carrier 20 includes a groove 22 defining an end face 22' that is configured to engage the second end 34 of the diaphragm spring 30. The groove 22 is formed as an axially extending indentation on the rotor carrier 20. The groove 22 has an axial extent (i.e. a dimension extending parallel to the axis (X)) that is dimensioned to receive the second end 34 of the diaphragm spring 30. The axial extent of the groove 22 is at least equal to an extent of the second end 34 of the diaphragm spring 30. In one embodiment, a radial depth of the groove 22 is less than a thickness of the diaphragm spring 30, as best shown in FIG. 3B.

In one embodiment, the at least one spacer 25a includes a shoulder 26 configured to engage the first end 32 of the diaphragm spring 30. In one embodiment, the shoulder 26 has an angled contact surface 26' configured to engage the first end 32 of the diaphragm spring 30. As used in this context, the term angled means that the surface 26' is not perpendicular to the axis (X), as shown by the dashed line in FIG. 3B intersecting the axis (X).

Figure 3A:
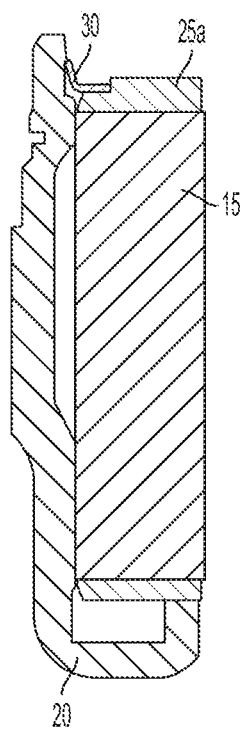
FIG. 3A is a side cross-sectional view of the fully assembled rotor assembly of FIG. 1.
Figure 3B:
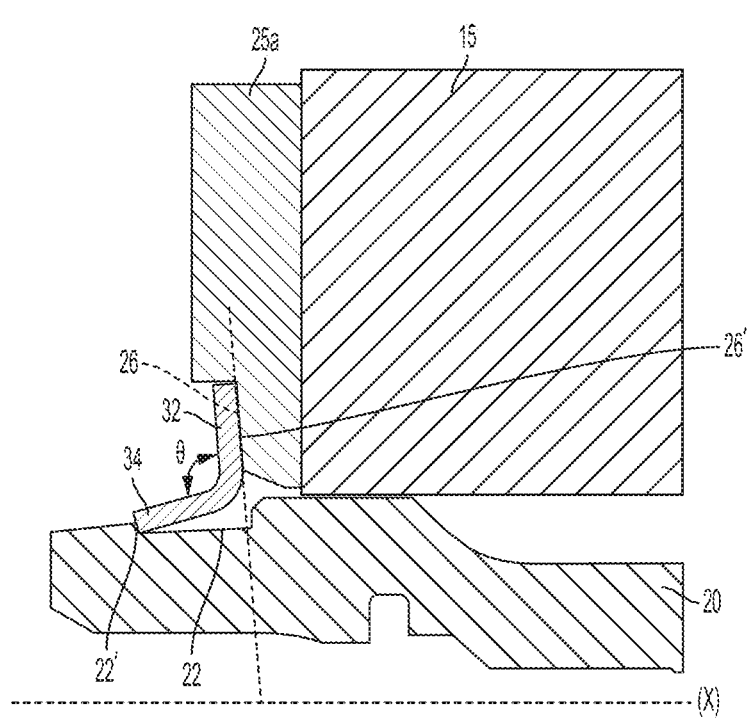
FIG. 3B is a magnified side cross-sectional view of a radially inner region of the fully assembled rotor assembly of FIG. 1.
Figure 4A:
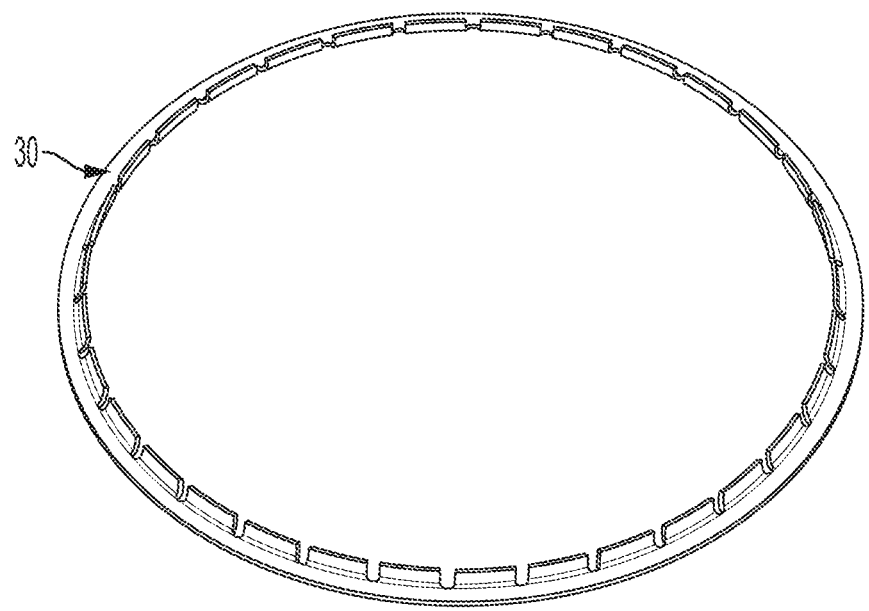
FIG. 4A is a perspective view of a diaphragm spring from the fully assembled rotor assembly of FIG. 1.
Figure 4B:
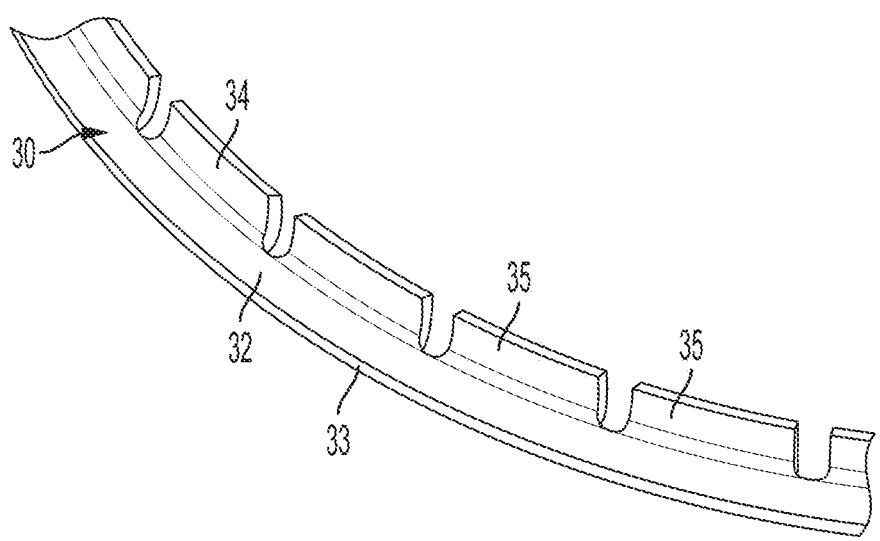
FIG. 4B is a magnified view of a portion of the diaphragm spring of FIG. 4A.
Figure 4C:
FIG. 4C is a side view of the diaphragm spring of FIGS. 4A and 4B.
Figure 4D:
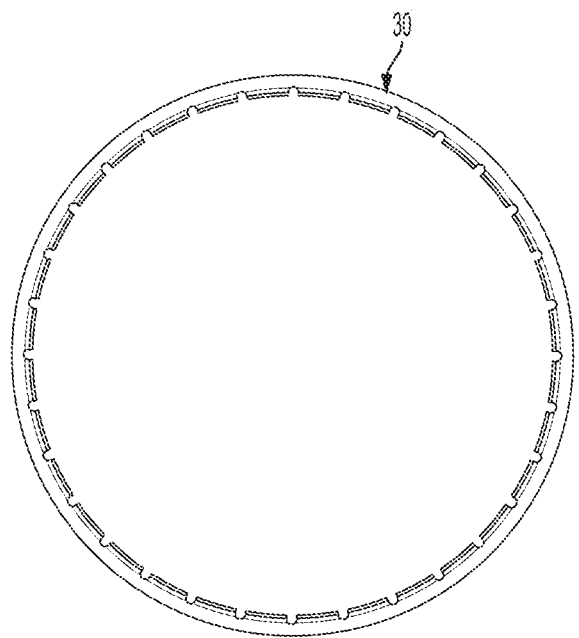
FIG. 4D is a front view of the diaphragm spring of FIGS. 4A-4C.

As shown in FIG. 3B, the angled contact surface 26' tapers axially outward in a radially outward direction. As shown in FIG. 3B, the first end 32 of the diaphragm spring 30 contacts an entirety of the angled contact surface 26' of the shoulder 26 of the at least one spacer 25a. A depth of the shoulder 26 is greater than a depth of the groove 22 in one embodiment.

The diaphragm spring 30 has a single curvature when viewed in a circumferential cross-section. In an assembled condition, an angle (θ) between 105 degrees-120 degrees is defined between the first end 32 and the second end 34 of the diaphragm spring 30. The angle (θ) between the first end 32 and the second end 34 can vary. Features of the diaphragm spring 30 can be modified depending on the particular configuration of the rotor carrier 20 and the spacer 25a.

The at least one spacer also includes a secondary spacer 25b arranged between a radially outer surface 15b of the rotor 15 and a radially inner surface of the rotor carrier 20. The at least one spacer 25a contacts: (i) a radially inner surface 15a of the rotor 15, and (ii) a radially outer surface of the first end 32 of the diaphragm spring 30.

Figure 5A:
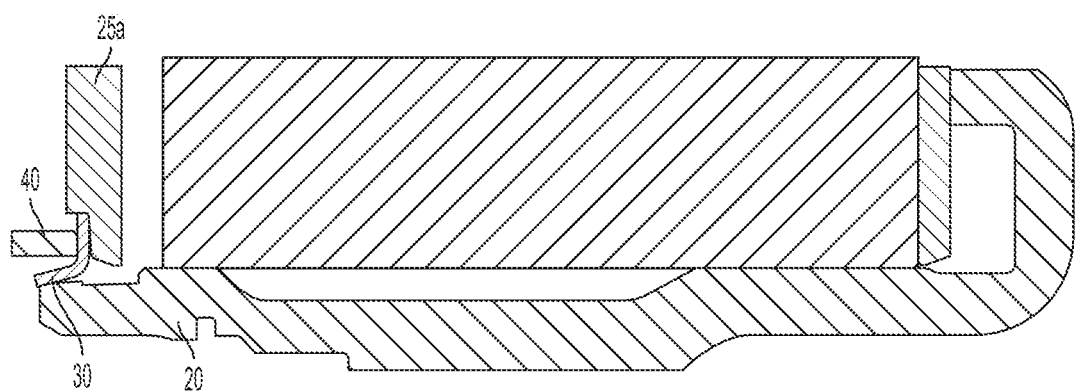
FIG. 5A is a cross-sectional view of the rotor assembly prior to installation of the diaphragm spring.
Figure 5B:
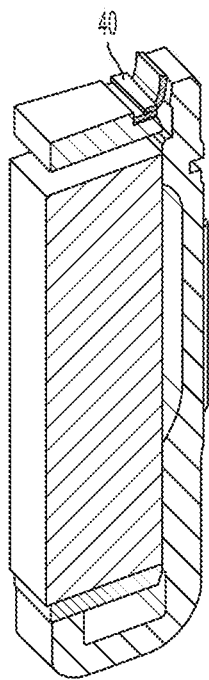
FIG. 5B is a perspective view showing a cross-section of a partially assembled rotor assembly.
Figure 5C:
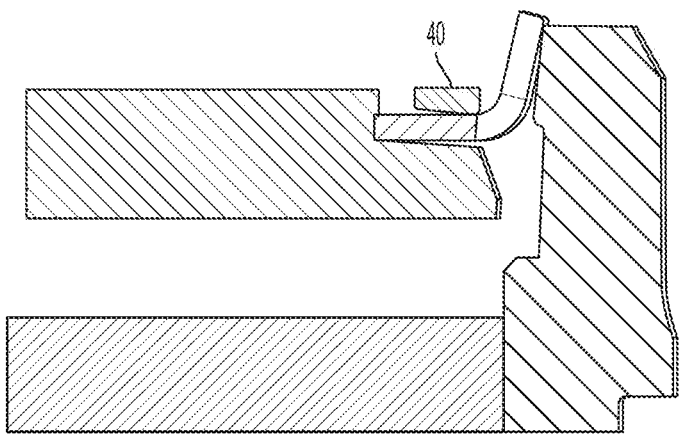
FIG. 5C is another cross-sectional view of the rotor assembly prior to installation of the diaphragm spring.

A method of assembling the rotor assembly 10 is also disclosed herein, as shown in FIGS. 5A-5C. The method generally includes positioning the diaphragm spring 30 between the first spacer 25a and the rotor carrier 20. Next, the diaphragm spring 30 is engaged, either by hand or an installation tool 40, until the diaphragm spring 30 snaps into place between the end face 22' of the groove 22 on the rotor carrier 20 and the angled contact surface 26' of the shoulder 26 of the first spacer 25a.

In one embodiment, in an installed state, a clamping or retention force from the diaphragm spring 30 is at least 30 kN. In one embodiment, the clamping force from the diaphragm spring 30 is 60 kN.

The diaphragm spring 30 provides a compressive clamping or retention force that retains the rotor 15, rotor carrier 20, and spacers 25a, 25b. This configuration does not require any additional elements to accomplish the retention arrangement.

Having thus described the present disclosure in detail, it is to be appreciated and will be apparent to those skilled in the art that many physical changes, only a few of which are exemplified in the detailed description of the invention, could be made without altering the inventive concepts and principles embodied therein.

It is also to be appreciated that numerous embodiments incorporating only part of the preferred embodiment are possible which do not alter, with respect to those parts, the inventive concepts and principles embodied therein.

The present embodiment and optional configurations are therefore to be considered in all respects as exemplary and/or illustrative and not restrictive, the scope of the embodiments being indicated by the appended claims rather than by the foregoing description, and all alternate embodiments and changes to this embodiment which come within the meaning and range of equivalency of said claims are therefore to be embraced therein.

LOG OF REFERENCE NUMERALS

Rotor assembly 10
Rotor 15
Radially inner surface 15a of rotor
Radially outer surface 15b of rotor
Rotor carrier 20
Groove 22
End face 22'
Spacers 25a, 25b
Shoulder 26
Angled contact surface 26'
Diaphragm spring 30
First end 32
Base rim 33
Second end 34
Fingers 35
Installation tool 40

What is claimed is:

1. A rotor assembly comprising:
a rotor;
a rotor carrier supporting the rotor;
at least one spacer arranged on a side of the rotor; and
a diaphragm spring including a first end formed on a radially outer end of the diaphragm spring that engages against the at least one spacer, and a second end formed on a radially inner end of the diaphragm spring that engages against the rotor carrier, wherein the at least one spacer includes a shoulder configured to engage the first end of the diaphragm spring.

2. The rotor assembly of claim 1, wherein the first end of the diaphragm spring includes a base rim and the second end of the diaphragm spring includes a plurality of fingers.

3. The rotor assembly of claim 2, wherein the plurality of fingers are uniformly spaced apart from each other and are arranged around an entire circumference of the diaphragm spring.

4. The rotor assembly of claim 2, wherein the plurality of fingers includes more than twenty fingers.

5. The rotor assembly of claim 1, wherein the rotor carrier includes a groove defining an end face that is configured to engage the second end of the diaphragm spring.

6. The rotor assembly of claim 1, wherein the shoulder has an angled contact surface configured to engage the first end of the diaphragm spring.

7. The rotor assembly of claim 6, wherein the first end of the diaphragm spring contacts an entirety of the angled contact surface of the shoulder of the at least one spacer.

8. The rotor assembly of claim 1, wherein the diaphragm spring has a single curvature when viewed in a circumferential cross-section.

9. The rotor assembly of claim 1, wherein in an assembled condition in which the first end of the diaphragm spring is engaged with a tapered shoulder of the at least one spacer and the second end of the diaphragm spring is engaged with an end face of a groove of the rotor carrier, an angle of 105 degrees-120 degrees is defined between the first end and the second end of the diaphragm spring.

10. The rotor assembly of claim 1, wherein the at least one spacer includes a secondary spacer arranged between an outer surface of the rotor and an inner surface of the rotor carrier.

11. The rotor assembly of claim 1, wherein the at least one spacer contacts: (i) a surface of the rotor, and (ii) a surface of the first end of the diaphragm spring.

12. The rotor assembly of claim 1, wherein the diaphragm spring has a uniform thickness.

13. The rotor assembly of claim 1, wherein the rotor, the rotor carrier, and the at least one spacer are retained with each other via a biasing force provided by the diaphragm spring.

14. A rotor assembly comprising:
a rotor;
a rotor carrier configured to support the rotor;
a first spacer abutting a first surface of the rotor;
a second spacer abutting a second surface of the rotor; and
a diaphragm spring including a first end formed as a continuous circular rim and a second end including a plurality of fingers extending around an entire periphery of the diaphragm spring and being spaced apart from each other,
wherein the first end abuts an angled contact surface on a shoulder formed on the first spacer, and the second end abuts an end face of a groove of the rotor carrier.

15. The rotor assembly of claim 14, wherein the diaphragm spring has a uniform thickness, and the diaphragm spring has a single curvature when viewed in a circumferential cross-section.

16. The rotor assembly of claim 14, wherein in an installed state, a clamping force from the diaphragm spring is at least 30 kN.

17. The rotor assembly of claim 14, wherein in an installed state, an angle of 105 degrees-120 degrees is defined between the first end and the second end of the diaphragm spring.

18. The rotor assembly of claim 14, wherein the first end of the diaphragm spring contacts an entirety of the angled contact surface of the shoulder of the first spacer.

19. The rotor assembly of claim 14, wherein the second spacer is arranged between the second surface of the rotor and a surface of the rotor carrier.

* * * * *